Levi H. Alexander's Improved Seine for taking Fish
117957     Fig. 1.     PATENTED AUG 15 1871
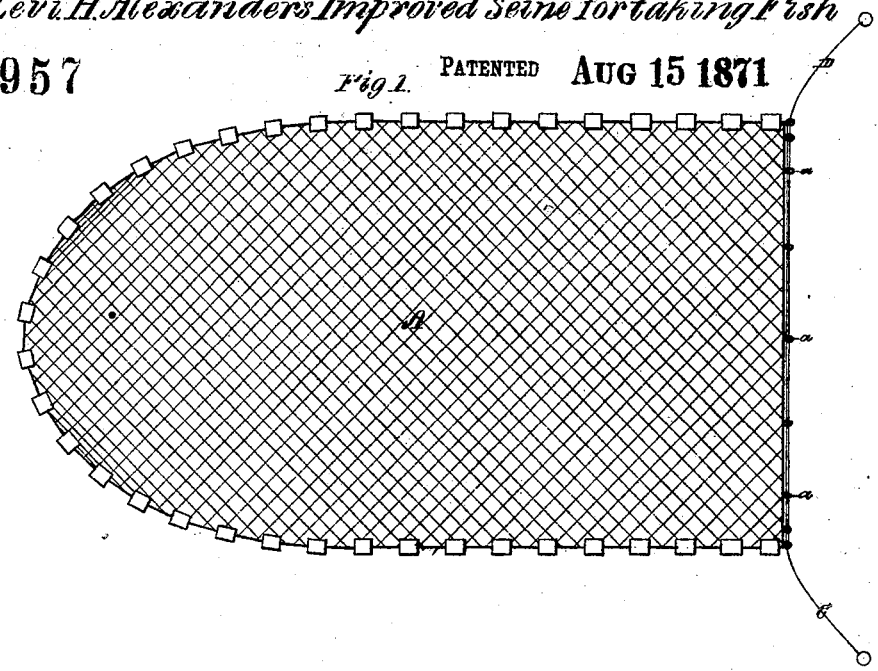
Fig. 2.
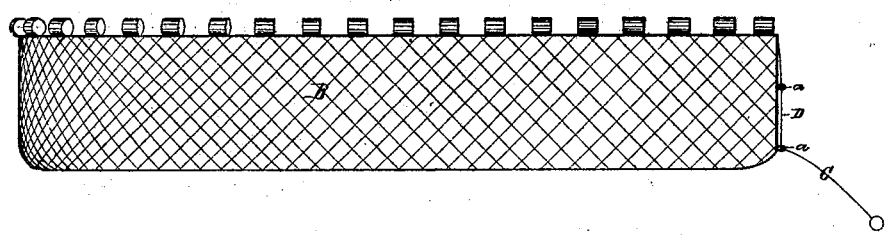
Fig. 3.
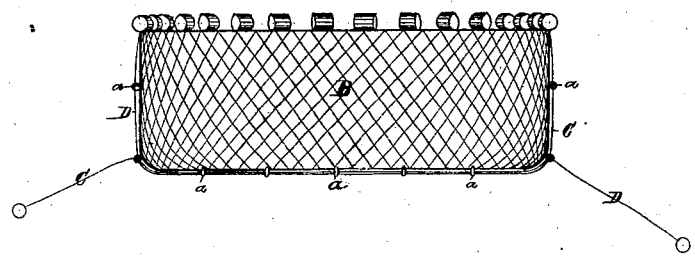
Witnesses.     L. H. Alexander:
S. N. Piper
L. N. Miller     by his attorney

UNITED STATES PATENT OFFICE.

LEVI H. ALEXANDER, OF GLOUCESTER, MASSACHUSETTS.

IMPROVEMENT IN FISHING-NETS.

Specification forming part of Letters Patent No. 117,957, dated August 15, 1871.

*To all whom it may concern:*

Be it known that I, LEVI H. ALEXANDER, of Gloucester, of the county of Essex and State of Massachusetts, have invented an Improved Seine for Taking Fish; and do hereby declare the same to be fully described in the following specification and represented in the accompanying drawing, of which—

Figure 1 is a top view, Fig. 2, a side elevation, and Fig. 3 a rear-end view of such seine.

In carrying out my invention I combine with a seine as ordinarily constructed a netted bottom, and have the seine open at its rear, and there provided with pursing-lines to enable it to be closed at its rear end, the seine along its upper edge having a series of floats, all being substantially as hereinafter described and shown.

In the drawing, A denotes the netted bottom, and B the netted sides and end of the seine, it being open at its rear end. C and D are the pursing-lines. They are attached to opposite corners of the mouth of the seine and run in opposite directions through a series of eyes or rings, *a a a*, fixed to the edge of the mouth, the whole being so that, by pulling such lines in opposite directions, the mouth may be gathered and closed.

A seine so made is far better in operation than a common seine without any bottom, and having its pursing-lines arranged around its lower edge; for with my improved seine there is little or no chance, comparatively, for the escape of fish when once within it, whereas with a common seine without a bottom, fish, after having been brought within the seine, are able to, and very often do, easily escape therefrom during the process of pursing it, as they can dive under the lower edge of it.

The seine is to be semicircular or round at its closed end, and to have parallel or about parallel sides, and a length from one to the other end of it about double the distance between the sides, thereby enabling the open end to be closed by the pursing-lines, and fish when in the net, generally, to be so far in advance of its mouth as not to escape by such during the operation of pursing or closing it.

The mode of setting my improved seine is much easier than that required for the common seine, it being done by the seine-carrying boat being rowed in a direction away from an advancing shoal of fish, while two other boats row outward in opposite directions with the corners of the mouth of the seine and in a line or course at right angles to that of the seine-boat. In this way the seine is not drawn around the fish, as is a common seine without a bottom while being set, but is drawn away from the shoal which enters it after it is set or while it is being set. After the fish have swam into the seine the men in the two corner boats are to seize the pursing-lines and draw them so as to close the mouth of the seine on the entrapped fish.

I make no claim to a seine made as described in the British patent No. 1,331, for 1867, the seine therein explained being either of a triangular or semicircular shape, with its mouth at one side of the triangle or at the diameter of the semicircle, such seine having no pursing-lines and being from its form not calculated for their use to advantage, as, in order to capture fish after entry into it, the mouth lead-line of such seine has to be drawn up and raised out of the water, the operation, owing to the form of the seine, enabling the fish to readily escape while it may be in progress. With my seine the fish will be mostly, if not entirely, at or near the front or closed end of it, and far distant from the mouth or open end, the operation of pursing the seine or closing its mouth being effected by draft in opposite directions on its two pursing-lines.

What I claim as my invention is—

1. An improved bottom seine, as constructed in manner, and provided with pursing lines, as hereinbefore described, and as represented in the accompanying drawing.

2. As a new or improved manufacture, and my invention, a fish-seine, as made with netted sides and a bottom, and as closed at one end and open at the other, and having the open end provided with pursing lines or devices, and the upper edge of the seine with floats, all being substantially as described.

LEVI H. ALEXANDER.

Witnesses:
R. H. EDDY,
S. N. PIPER.